(12) United States Patent
Kuo et al.

(10) Patent No.: US 8,590,298 B2
(45) Date of Patent: Nov. 26, 2013

(54) CHANGEABLE DAMPING WAVE POWER CAPTURING DEVICE DRIVEN BY BIDIRECTIONAL SCREW ROD

(75) Inventors: Yin-Ling Kuo, Yunlin County (TW); Chih-Wei Yen, Hsinchu (TW); Wei-Ming Chen, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 338 days.

(21) Appl. No.: 12/980,837

(22) Filed: Dec. 29, 2010

(65) Prior Publication Data

US 2012/0085089 A1    Apr. 12, 2012

(30) Foreign Application Priority Data

Oct. 8, 2010   (TW) ............................... 99134294 A (51) Int. Cl.
*F03B 13/18* (2006.01)
(52) U.S. Cl.
USPC ............................................... 60/507; 60/497
(58) Field of Classification Search
USPC ................ 74/24, 34–35, 352, 355, 368, 377; 60/495–507
See application file for complete search history.

(56) References Cited

U.S. PATENT DOCUMENTS

| | | | | |
|---|---|---|---|---|
| 2,280,683 A * | 4/1942 | Bedford | ..................... | 192/54.51 |
| 3,220,275 A * | 11/1965 | Hewes et al. | ................... | 74/368 |
| 3,964,264 A * | 6/1976 | Tornabene | ..................... | 405/76 |
| 3,983,759 A * | 10/1976 | Linden | .............................. | 74/88 |
| 4,284,901 A * | 8/1981 | Giguere | .......................... | 290/53 |
| 5,929,531 A * | 7/1999 | Lagno | ............................. | 290/53 |
| 7,626,279 B2 * | 12/2009 | Brown et al. | ................. | 290/1 R |
| 7,768,143 B2 * | 8/2010 | McCague et al. | ............... | 290/42 |
| 2008/0084069 A1 | 4/2008 | Lee | | |
| 2008/0295626 A1 * | 12/2008 | Jayasuriya | ..................... | 74/117 |
| 2009/0251258 A1 | 10/2009 | Rhinefrank et al. | | |
| 2010/0300223 A1 * | 12/2010 | Farb | ................................ | 74/35 |

FOREIGN PATENT DOCUMENTS

WO   2009102210 A1   8/2009

OTHER PUBLICATIONS

Taichi Matsuoka, Kenichiro Omata, Hiroyuki Kanda and Kenichiro Tachi, A Study of Wave Energy Conversion Systems Using Ball Screws—Comparison of Output Characteristics of the Fixed Type and the Floating Type, ISOPE conf.(International Offshore and Polar Engineering Conference), May 26, 2002, 581-585.

Kenichiro Ohmata, Hiroka Zu Shimoda, Tetsu Ya Sasoh, Yasushi Sakagami, Studies on Ball Screw Type Wave Power Generator, Meiji University, Institute of Science and Technology Minutes, vol. 22 No. 4, Jul. 15, 1983, 4-1–4-19.

(Continued)

*Primary Examiner* — Thomas Denion
*Assistant Examiner* — Brian Inacay
(74) *Attorney, Agent, or Firm* — WPAT, PC; Justin King (57) ABSTRACT

A changeable damping wave power capturing device driven by bidirectional screw rod is provided, which uses the ball screw device to capture the wave power and prevents the energy lost caused by complex mechanism. In addition, bidirectional reciprocating rectilinear motion is changed to unidirectional rotation by the ratchet wheel device, and then the rotating energy is imported to the generating set. Besides, the wave power capturing device driven by bidirectional screw rod uses the control device to detect wave energy and choose different generator, the control device could change the damping value and improve the efficiency that transforming wave energy.

10 Claims, 7 Drawing Sheets

(56) References Cited

OTHER PUBLICATIONS

Emmanuel B. Agamloh, Alan K. Wallace, Annet Te Von Jouanne, A novel direct-drive ocean wave energy extraction concept with contact-less force transmission system, Renewable Energy, vol. 33, Issue 3, Mar. 1, 2008, 520-529.

Rhinefrank K, Agamloh EB, Von Jouanne A, Wallace AK, PRUDE11 J, Kimble K, A novel ocean energy permanent magnet linear, Renew Energy vol. 31, Issue 9, Jul. 1, 2006, 1279-1298.

* cited by examiner

CHANGEABLE DAMPING WAVE POWER CAPTURING DEVICE DRIVEN BY BIDIRECTIONAL SCREW ROD

BACKGROUND OF THE INVENTION

1. Field of Invention

The present invention relates to a wave power capturing technology, and more particularly to a changeable damping wave power capturing device driven by a bidirectional screw rod.

2. Related Art

According to European Thematic Network on Wave Energy, among the wave energy, the resources capable of being economically exploited are up to 2000 terawatt-hour (TWh) per year, which, for example, approximately occupies 11% of the total world power generation amount in the year of 2005. With the exhaustion of the global petrochemical energy, the wave energy power generation attracts the attention and the investment of various countries, in which wave energy power generation devices, for example, an impacting type, a pump type, an oscillating air chamber type, and a linear direct-driving type, are developed. However, during the energy delivery of the above system, since the mechanical system is complex, the efficiency of transforming the wave power to the electric power is poor.

In addition, during the wave energy power generation, a floating body is forced by an external force of waves to move up and down, such that through the characteristic, the wave energy is absorbed for being used by the power generation. However, the wave energy of the sea is affected by the wind power and the climate, such that in different seasons and regions, the height and the period of the waves show a probability distribution manner. Further, the external forces of the wave energy may also be different, for the floating body system used in the wave energy power generation, the motion characteristics are affected by a system damping. However, recently, the system damping of the floating body system used in the wave energy power generation is not changed with the state of the waves, which may result in a problem of an energy transforming efficiency.

To sum up, it is necessary to propose a wave power capturing device directly driven by a ball screw device, capable of reducing energy transforming lost and changing a damping value of a device system, so as to solve the problem generated in the prior art.

SUMMARY OF THE INVENTION

The present invention is directed to a wave power capturing device directly driven by a ball screw device, capable of reducing power transforming lost, generating a higher power generation efficiency, and changing a damping value of a device system by changing a load of a connected generator, so as to improve an efficiency of a wave energy transforming system.

In a preferred embodiment, the present invention provides a changeable damping wave power capturing device driven by a bidirectional screw rod, which includes an elevator floating body; a water-proofing outer barrel assembly, comprising at least one water-proofing outer barrel comprising a channel, and connected to the elevator floating body; a ball screw rod assembly, comprising a ball screw nut, a ball screw shaft, and a shaft, in which the ball screw nut is connected to the water-proofing outer barrel, the ball screw nut is movably disposed on the ball screw shaft, such that the ball screw nut performs a relative motion on the ball screw shaft, and the shaft is connected to the ball screw shaft; a reverse pawl-ratchet wheel assembly, connected to the shaft, and comprising a reverse pawl-ratchet wheel and a first active gear, in which the reverse pawl-ratchet wheel comprises at least one reverse ratchet pawl, and the first active gear comprises at least one reverse recess for accommodating the reverse ratchet pawl; a forward pawl-ratchet wheel assembly, connected to the shaft, and comprising a forward pawl-ratchet wheel and a second active gear, in which the forward pawl-ratchet wheel comprises at least one forward ratchet pawl, and the second active gear comprises at least one forward recess for accommodating the forward ratchet pawl; a gear assembly, engaged with the first active gear and the second active gear, and comprising a plurality of idle gears, a first slave gear, a second slave gear, a third slave gear, a fourth slave gear, a fifth slave gear, a sixth slave gear, a seventh slave gear, and an eighth slave gear; a first generating set, comprising a rotation shaft connected to the first slave gear and the second slave gear; a second generating set, comprising a rotation shaft connected to the third slave gear and the fourth slave gear; an accommodating device, comprising at least one hole, at least one guiding sliding sleeve, and an accommodating region, in which the water-proofing outer barrel and the ball screw shaft pass through the hole, and the guiding sliding sleeve prevents water from leaking from a seam position of the water-proofing outer barrel and the hole; and a control device, comprising a detecting element, a control set, and an elevator control mechanism, in which the detecting element is connected to the elevator floating body or the water-proofing outer barrel assembly and is electrically connected to the control set, the control set is disposed in the accommodating region and is electrically connected to the elevator control mechanism, the elevator control mechanism is connected to the fifth slave gear or the sixth slave gear, or the seventh slave gear and the eighth slave gear, through elevation of the elevator control mechanism, the gears are correspondingly elevated, so as to activate the first generating set or the second generating set.

The changeable damping wave power capturing device driven by the bidirectional screw rod is up and down in the sea by using the elevator floating body, the ball screw nut is made to perform the relative motion on the ball screw shaft, so as to drive the ball screw shaft to rotate, then the reverse pawl-ratchet wheel assembly and the forward pawl-ratchet wheel assembly transform a rectilinear motion to unidirectional rotation, next, the gear assembly transmits the power to the generating set, the detecting element measures wind waves in the sea, the control set provides signals for the elevator control mechanism, so as to activate a generator with an appropriate power, thereby optimizing a power generation amount of the changeable damping wave power capturing device driven by the bidirectional screw rod.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the features, the objectives, and the functions of the present invention comprehensible to the examiner, relevant detailed structures and design concepts of the system according to the present invention are described below, such that the examiner can know the characteristics of the present invention. The detailed description is as follows.

Figure 1:
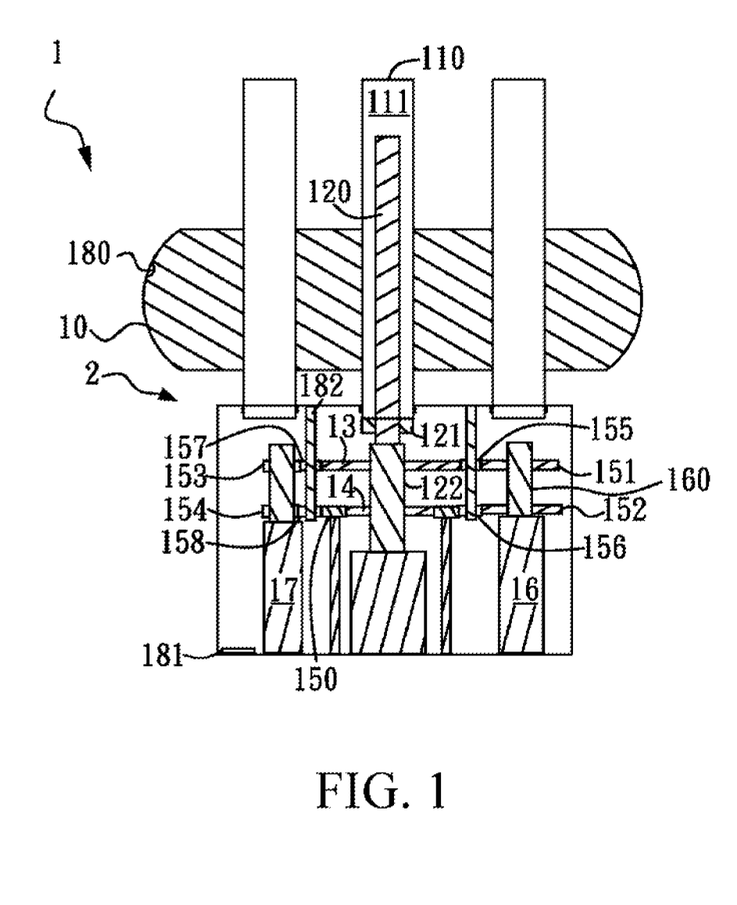
FIG. 1 is a schematic cross-sectional view of a changeable damping wave power capturing device driven by a bidirectional screw rod according to a first embodiment of the present invention.

The present invention provides a changeable damping wave power capturing device driven by a bidirectional screw rod. FIG. 1 is a schematic cross-sectional view of a changeable damping wave power capturing device driven by a bidirectional screw rod according to a first embodiment of the present invention.

Figure 2:
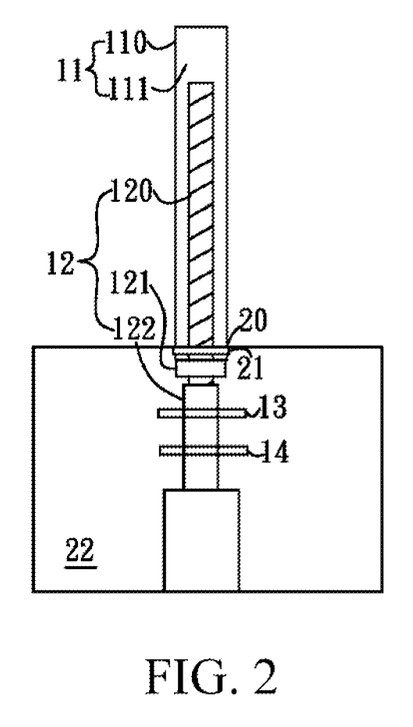
FIG. 2 is a schematic view of a ball screw rod assembly.
Figure 3A:
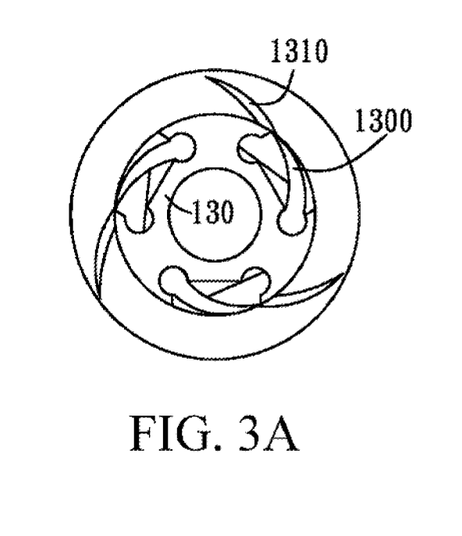
FIG. 3A is a schematic view of actuation of a reverse pawl-ratchet wheel assembly.
Figure 3B:
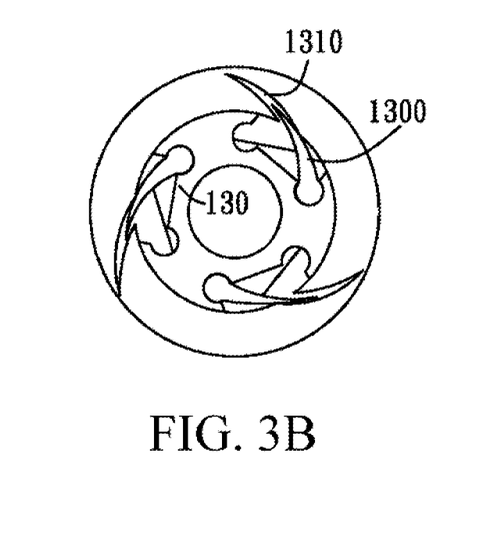
FIG. 3B is a schematic view of actuation of the reverse pawl-ratchet wheel assembly.
Figure 3C:
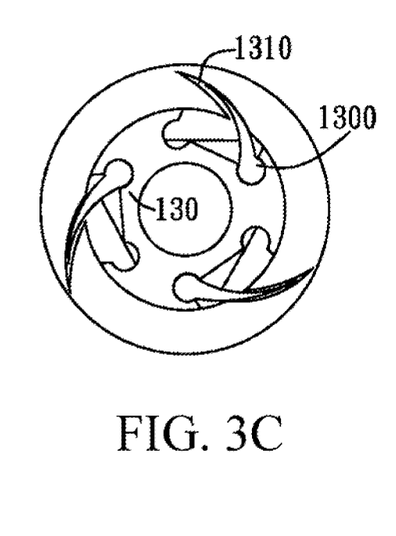
FIG. 3C is a schematic view of actuation of the reverse pawl-ratchet wheel assembly.
Figure 4:
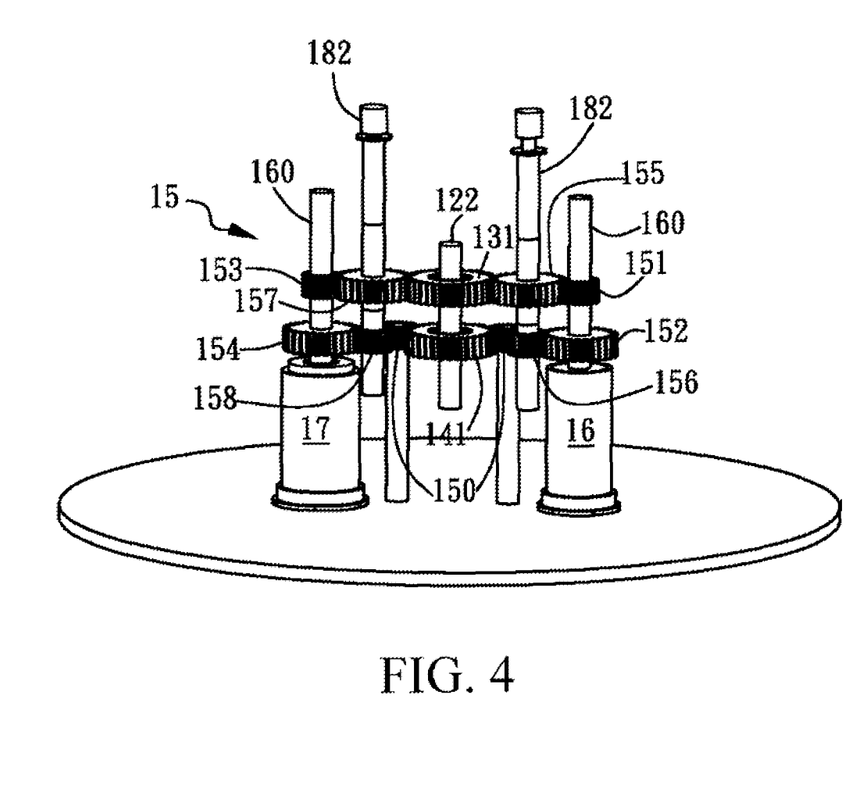
FIG. 4 is a schematic view of changing a bidirectional mechanism to a unidirectional mechanism.
Figure 5A:
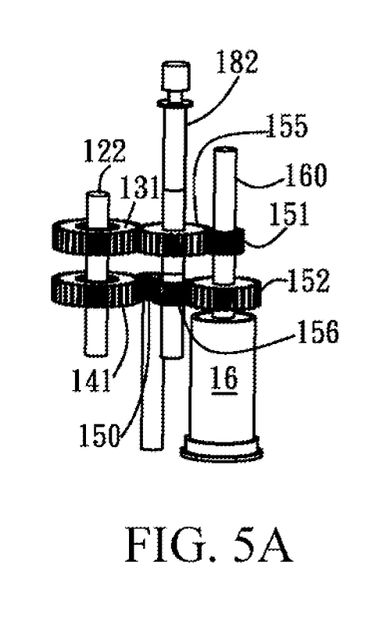
FIG. 5A is a schematic view of an elevator control mechanism according to the first embodiment of the present invention.
Figure 5B:
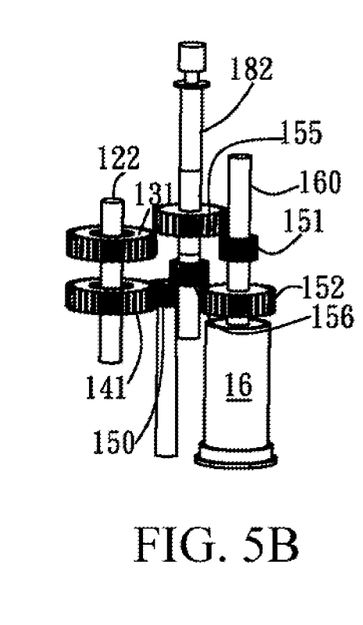
FIG. 5B is a schematic view of the elevator control mechanism according to the first embodiment of the present invention.

Referring to FIG. 1, the changeable damping wave power capturing device driven by a bidirectional screw rod 1 includes an elevator floating body 10, a water-proofing outer barrel assembly 11, a ball screw rod assembly 12, a reverse pawl-ratchet wheel assembly 13, a forward pawl-ratchet wheel assembly 14, a gear assembly 15, a first generating set 16, a second generating set 17, and a control device 18. The elevator floating body 10 is used to bear a driving force of an external force of waves, the water-proofing outer barrel assembly 11 includes at least one water-proofing outer barrel 110 including a channel 111, and the water-proofing outer barrel assembly 11 is connected to the elevator floating body 10. FIG. 2 is a schematic view of the ball screw rod assembly. The ball screw rod assembly 12 is a direct-driving mechanism of transforming a wave energy to a mechanical energy, and includes a ball screw shaft 120, a ball screw nut 121, and a shaft 122. The ball screw nut 121 is connected to the water-proofing outer barrel 110, and the ball screw nut 121 is movably disposed on the ball screw shaft 120, such that the ball screw nut 121 may perform a relative motion on the ball screw shaft 120, and the shaft 122 is connected to the ball screw shaft 120. The water-proofing outer barrel 11 is used to protect the ball screw rod assembly 12 from being soaked by seawater and enable the ball screw rod assembly 12 to have a function of a sliding guide rod. In this embodiment, when the elevator floating body 10 is forced by a downward external force of the waves, the ball screw shaft 120 is rotated in an anti-clockwise manner; and when the elevator floating body 10 is forced by an upward external force of the waves, the ball screw shaft 120 is rotated in a clockwise manner. In a preferred embodiment, the water-proofing outer barrel assembly includes a plurality of water-proofing outer barrels, but the ball screw rod assembly 12 is only disposed in one of the water-proofing outer barrels 110. A function of the plurality of water-proofing outer barrels 110 is to improve rigidity of the water-proofing outer barrel 110. If only one water-proofing outer barrel 110 exists, the water-proofing outer barrel 110 is easily forced by the force of the sea wave to be bent or broken. In another embodiment, an outer diameter of the water-proofing outer barrel 110 is closed to a cross-sectional diameter of the elevator floating body 10, but an inner diameter of the water-proofing outer barrel 110 is approximately equal to a width of the ball screw nut 121, that is, the rigidity of the water-proofing outer barrel 110 is improved through thickness, so as to prevent the water-proofing outer barrel 110 from being easily bent, but a manner of improving the rigidity of the water-proofing outer barrel is not limited hereto. The reverse pawl-ratchet wheel assembly 13 is connected to the shaft 122, and the reverse pawl-ratchet wheel assembly 13 includes a reverse pawl-ratchet wheel 130 and a first active gear 131. The reverse pawl-ratchet wheel 130 includes at least one reverse ratchet pawl 1300, the reverse ratchet pawl 1300 includes an elastic sheet, and the elastic sheet provides an outward pushing-off elastic force for the reverse ratchet pawl 1300. FIG. 3A, FIG. 3B, and FIG. 3C are schematic views of actuation of the reverse pawl-ratchet wheel assembly. The first active gear 131 includes at least one reverse recess 1310 for accommodating the reverse ratchet pawl 1300. When the reverse ratchet pawl 1300 is limited to be rotated in an inner diameter of the first active gear 131, the reverse ratchet pawl 1300 is pressed to force the elastic sheet located therein to be forced by a compression force, so as to be combined as a round shape. When the reverse ratchet pawl 1300 is rotated in the anti-clockwise manner, the reverse ratchet pawl 1300 is snapped in the reverse recess 1310 in the inner diameter of the first active gear 131, so as to drive the first active gear 131 to rotate; and when the reverse ratchet pawl 1300 is rotated in the clockwise manner, the reverse ratchet pawl 1300 cannot be snapped in the reverse recess 1310 in the inner diameter of the first active gear 131, and the first active gear 131 is not rotated. The forward pawl-ratchet wheel assembly 14 is connected to the shaft 122, and the forward pawl-ratchet wheel assembly 14 includes a forward pawl-ratchet wheel and a second active gear 141. The forward pawl-ratchet wheel includes at least one forward ratchet pawl, and the second active gear 141 includes at least one forward recess for accommodating the forward ratchet pawl. An actuation manner of the forward pawl-ratchet wheel is the same as that of the reverse pawl-ratchet wheel 130, and is not described here. The gear assembly 15 is engaged with the first active gear 131 and the second active gear 141, and the gear assembly 15 includes a plurality of idle gears 150, a first slave gear 151, a second slave gear 152, a third slave gear 153, a fourth slave gear 154, a fifth slave gear 155, a sixth slave gear 156, a seventh slave gear 157, and an eighth slave gear 158. FIG. 4 is a schematic view of changing a bidirectional mechanism to a unidirectional mechanism. In this embodiment, the plurality of idle gears 150 is engaged with the second active gear 141, the fifth slave gear 155 and the seventh slave gear 157 are engaged with the first active gear 131, the sixth slave gear 156 and the eighth slave gear 158 are engaged with the plurality of idle gears 150, the first slave gear 151 is engaged with the fifth slave gear 155, the second slave gear 152 is engaged with the sixth slave gear 156, the third slave gear 153 is engaged with the seventh slave gear 157, and the fourth slave gear 154 is engaged with the eighth slave gear 158. When the reverse pawl-ratchet wheel assembly 13 is rotated in the anti-clockwise manner and the forward pawl-ratchet wheel assembly 14 is rotated in the clockwise manner, the gear assembly 15 is driven, such that the generator keeps the rotation in the same direction (an anti-clockwise direction in this embodiment). Definitely, for the connection manner of the gear assembly and the pawl-ratchet wheel assembly, the plurality of idle gears 150 is engaged with the first active gear 131, the fifth slave gear 155 and the seventh slave gear 157 are engaged with the plurality of idle gears 150, and the sixth slave gear 156 and the eighth slave gear 158 are engaged with the second active gear 141, the first slave gear 151 is engaged with the fifth slave gear 155, the second slave gear 152 is engaged with the sixth slave gear 156, the third slave gear 153 is engaged with the seventh slave gear 157, and the fourth slave gear 154 is engaged with the eighth slave gear 158, such that when the pawl-ratchet wheel assembly is rotated, the generator may keep the rotation in the clockwise direction. The first generating set 16 includes a rotation shaft 160, and the rotation shaft 160 is connected to the first slave gear 151 and the second slave gear 152. The second generating set 17 includes a rotation shaft 160, and the rotation shaft 160 is connected to the third slave gear 153 and the fourth slave gear 154. The control device 18 includes a detecting element 180, a control set 181, and an elevator control mechanism 182. When the changeable damping wave power capturing device driven by the bidirectional screw rod 1 is connected to different generators, borne loads are different, such that damping value of the inner system are also different, in which the damping value of the inner system affects motion characteristics of the floating body. The detecting element 180 is connected to the elevator floating body 10 or the water-proofing outer barrel assembly 11, the control set 181 is electrically connected to the detecting element 180, the elevator control mechanism 182 is connected to the fifth slave gear 155 and the sixth slave gear 156, or the seventh slave gear 157 and the eighth slave gear 158, and is electrically connected to the control set 181. When the detecting element 180 captures a wave energy signal, elevation of the elevator control mechanism is controlled by a signal provided by the control set 181 for the elevator control mechanism 182, and the corresponding gears may be correspondingly elevated, so as to activate the first generating set 16 or the second generating set 17. FIG. 5A and FIG. 5B are schematic views of the elevator control mechanism according to a first embodiment of the present invention. In this embodiment, when the detecting element 180 detects a great wave energy, the control set 181 provides the signal for the elevator control mechanism 182, such that the elevator control mechanism 182 corresponding to the first generating set 16 is down, and the fifth slave gear 155 and the sixth slave gear 156 are engaged with the first active gear 131 and the idle gear 150, as shown in FIG. 5A, and the first slave gear 151 and the second slave gear 152 are driven, so as to drive the first generating set 16. In this embodiment, the first generating set 16 is a great generator, but the present invention is not limited thereto. Similarly, when the detecting element 180 detects a small wave energy, the control set 181 provides the signal for the elevator control mechanism 182, such that the elevator control mechanism 182 corresponding to the first generating set 16 is up, as shown in FIG. 5B, the fifth slave gear 155 and the sixth slave gear 156 are not engaged with the first active gear 131 and the idle gear 150. Here, the elevator control mechanism 182 corresponding to the second generating set 17 is down, such that the seventh slave gear 157 and the eighth slave gear 158 are engaged with the first active gear 131 and the idle gear 150, and the third slave gear 153 and the fourth slave gear 154 are driven, so as to drive the second generating set 17. In this embodiment, the second generating set 17 is a small generator, but the present invention is not limited thereto. When the detecting element 180 captures a greater wave energy signal, when the wave energy is transmitted through the mechanism, the first generating set 16 and the second generating set 17 are activated to capture the wave energy together for power generation. The elevator control mechanism 182 is used to activate the generators having the different capacities, so as to achieve the motion characteristics of the floating body having the varied damping values, thereby optimizing a power generation amount of the system. In this embodiment, the changeable damping wave power capturing device further includes an accommodating device 2 including a hole 20, a guiding sliding sleeve 21, and an accommodating region 22. The water-proofing outer barrel 110 and the ball screw shaft 120 pass through the hole 20, the guiding sliding sleeve 21 prevents water from leaking from a seam position of the water-proofing outer barrel 110 and the hole 20, the reverse pawl-ratchet wheel assembly 13, the forward pawl-ratchet wheel assembly 14, the gear assembly 15, the first generating set 16, the second generating set 17, the elevator control mechanism 182, and the control set 181 are located in the accommodating region 22.

Figure 6:
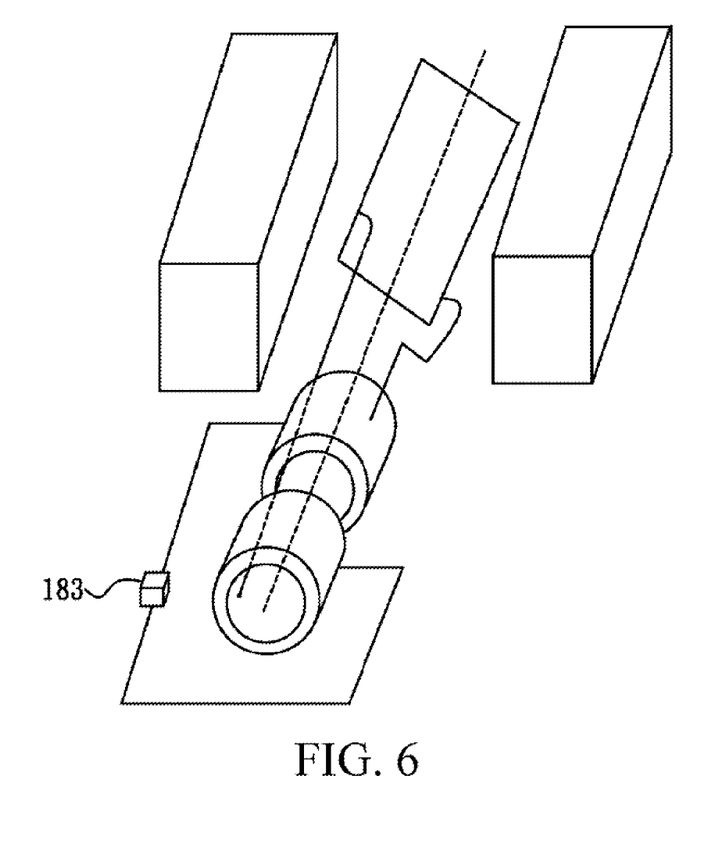
FIG. 6 is a schematic view of an on/off device in a generating set according to a second embodiment of the present invention.

The present invention provides a second embodiment, so as to choose to control to activate a specific generating set. In the second embodiment, the elevator control mechanism 182 is replaced with an on/off device 183. FIG. 6 is a schematic view of the on/off device in the generating set according to the second embodiment of the present invention. Referring to FIG. 6, the on/off device 183 is disposed in the first generating set 16 or the second generating set 17 and is electrically connected to the control set 181. When the detecting element 180 captures the wave energy signal, the control set 181 activates the on/off device 183 in the first generating set 16 or the second generating set 17 according to the wave energy signal, in which the on/off device 183 can enable a circuit generating a current in the first generating set 16 or the second generating set 17 to be closed or open, so as to control to activate the first generating set 16 or the second generating set 17.

Figure 7:
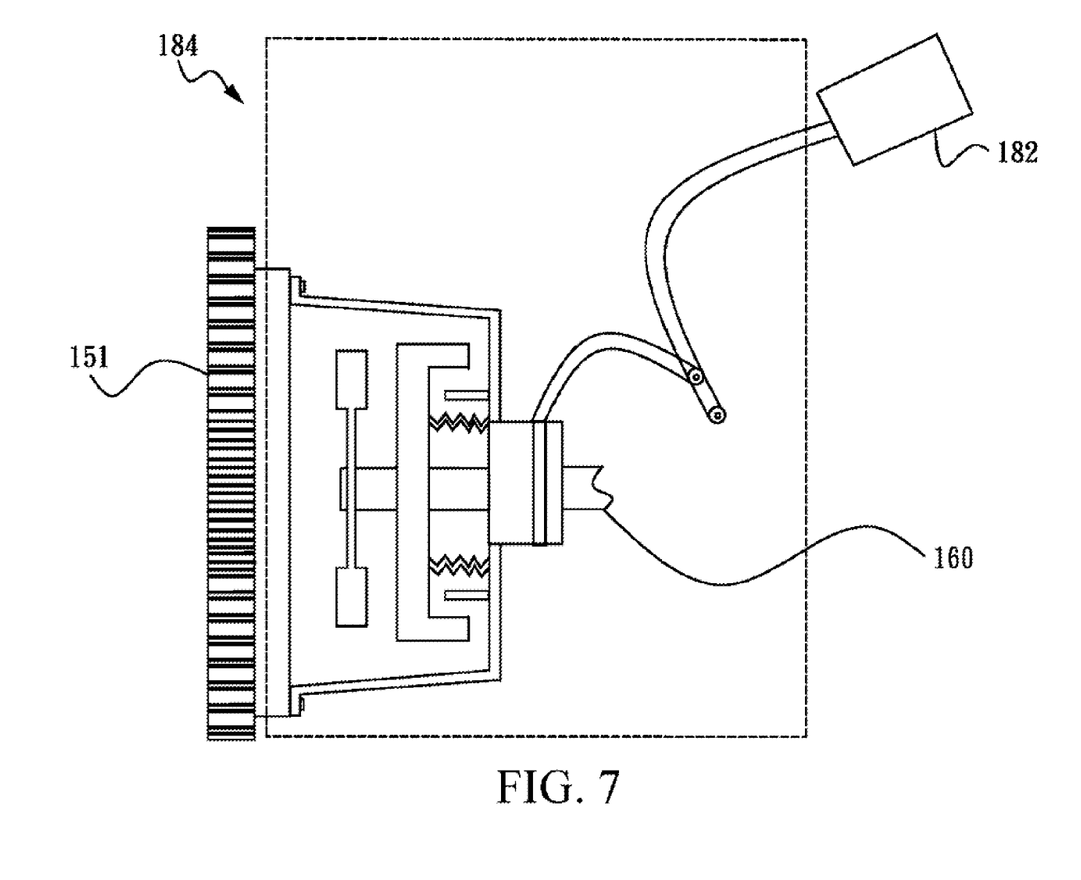
FIG. 7 is a schematic view of a clutch device according to a third embodiment of the present invention.

The present invention provides a third embodiment, so as to control to activate the first generating set 16 or the second generating set 17. In the third embodiment, the control device 18 includes a detecting element 180, a control set 181, an elevator control mechanism 182, and a clutch device 184. FIG. 7 is a schematic view of the clutch device according to a third embodiment of the present invention. Referring to FIG. 7, in this embodiment, the first slave gear 151 is set as an example, and the rotation shaft 160 is not connected to the first slave gear 151 but is connected to the clutch device 184. In addition, the clutch device 184 is also connected to the elevator control mechanism 182, and the clutch device 184 is disposed in the first slave gear 151, but the clutch device 184 may also be disposed in the second slave gear 152, the third slave gear 153, or the fourth slave gear 154. When the elevator control mechanism 182 receives the signal of the control set 181 and presses downwards, the clutch device 184 is actuated, such that the rotation shaft 160 is rotated along with the first slave gear 151, so as to activate the first generating set 16. Definitely, when the clutch device 184 is disposed on the second slave gear 152, the third slave gear 153, or the fourth slave gear 154, the first generating set 16 or the second generating set 17 may be activated. The clutch device is known by persons in the prior art, and the detailed actuation manner is not described.

The changeable damping wave power capturing device driven by the bidirectional screw rod is up and down in the sea by using the elevator floating body, so as to drive the ball screw shaft to rotate, the ball screw is used as the direct-driving mechanism of the device, so as to prevent the energy lost caused by complex mechanism, the rectilinear motion is transformed to the rotation motion by the ball screw shaft, then the reverse pawl-ratchet wheel assembly and the forward pawl-ratchet wheel assembly transform the rectilinear motion to the unidirectional rotation, next, the first gear assembly and the second gear assembly transmit the power to the first generating set and the second generating set, the detecting element measures wind waves in the sea, the control set provides the signal to activate the generator the an appropriate power, thereby optimizing the power generation amount of the changeable damping wave power capturing device driven by the bidirectional screw rod.

The above-mentioned is only preferred embodiments of the present invention, and is not used to limit the scope of the present invention. It is intended that equivalent modifications and variations falling made according to the claims of the present invention and according with the meanings of the present invention are considered as the further implementation of the present invention.

What is claimed is:

1. A changeable damping wave power capturing device driven by a bidirectional screw rod assembly, comprising:
   an elevator floating body;
   a water-proofing outer barrel assembly, comprising at least one water-proofing outer barrel including a channel, and connected to the elevator floating body;
   the bidirectional screw rod assembly, comprising a ball screw nut, a ball screw shaft, and a shaft, wherein the ball screw nut is connected to the water-proofing outer barrel, the ball screw nut is movably disposed on the ball screw shaft for performing a relative motion on the ball screw shaft, and the shaft is connected to the ball screw shaft;
   a reverse pawl-ratchet wheel assembly, comprising a reverse pawl-ratchet wheel, a first ring-shaped active gear, and a reverse ratchet pawl positioned within the first ring-shaped active gear, wherein the reverse pawl-ratchet wheel assembly connects to the shaft, and the first ring-shaped active gear comprises at least one internal reverse recess for accommodating the reverse ratchet pawl;
   a forward pawl-ratchet wheel assembly, comprising a forward pawl-ratchet wheel, a second ring-shaped active gear, and a forward ratchet pawl positioned within the second ring-shaped active gear, wherein the forward pawl-ratchet wheel assembly connects to the shaft, and the second ring-shaped active gear comprises at least one internal forward recess for accommodating the forward ratchet pawl;
   a first gear assembly, engaged with the first ring-shaped active gear and the second ring-shaped active gear, and comprising a first idle gear, a first slave gear, and a second slave gear;
   a first generating set, comprising a first generating set rotation shaft connected to the first slave gear and the second slave gear; and
   an accommodating device, comprising at least one hole, at least one guiding sliding sleeve, and an accommodating region, wherein the water-proofing outer barrel and the ball screw shaft pass through the hole, and the guiding sliding sleeve prevents water from leaking from a seam position of the water-proofing outer barrel and the hole.

2. The changeable damping wave power capturing device according to claim 1, wherein the first idle gear is engaged with and positioned between the first ring-shaped active gear and the first slave gear, and the second slave gear is engaged with the second ring-shaped active gear.

3. The changeable damping wave power capturing device according to claim 1, wherein the first idle gear is engaged with and positioned between the second ring-shaped active gear and the second slave gear, and the first slave gear is engaged with the first ring-shaped active gear.

4. The changeable damping wave power capturing device according to claim 1, wherein the reverse pawl-ratchet wheel assembly, the forward pawl-ratchet wheel assembly, the first gear assembly, and the first generating set are disposed in the accommodating region.

5. The changeable damping wave power capturing device according to claim 1, further comprises a control device, wherein said control device comprises:
   a detecting element, connected to the elevator floating body or the water-proofing outer barrel assembly;
   a control set, disposed in the accommodating region and electrically connected to the detecting element and the elevator control mechanism; and
   an on/off device, disposed in the first generating set and electrically connected to the control set, wherein said on/off device enables a circuit generating a current in the first generating set to be closed or open, so as to choose to activate the first generating set.

6. The changeable damping wave power capturing device according to claim 1, further comprises a control device, wherein said control device comprises:
   a detecting element, connected to the elevator floating body or the water-proofing outer barrel assembly;
   a control set, disposed in the accommodating region and is electrically connected to the detecting element;
   a first elevator control mechanism, electrically connected to the control set; and
   a first clutch device, connected to the first elevator control mechanism and the first rotation shaft, and disposed in the first slave gear and the second slave gear, wherein the first clutch device activates the first generating set through enabling the first rotation shaft to rotate with the first slave gear or the second slave gear.

7. The changeable damping wave power capturing device driven by a bidirectional screw rod according to claim 1, further comprises a control device, wherein said control device comprises:
   a detecting element, connected to the elevator floating body or the water-proofing outer barrel assembly;
   a control set, disposed in the accommodating region and is electrically connected to the detecting element and the first elevator control mechanism; and
   a first elevator control mechanism, connecting to a fifth slave gear and a sixth slave gear, wherein the fifth slave gear engages to and positions between the first ring-shaped active gear and first slave gear; the sixth slave gear engages to and positions between the first idle gear and second slave gear; and through elevation of the first elevator control mechanism, the fifth slave gear and the sixth slave gear are correspondingly elevated and decoupled from their respective adjacent gears, so as to deactivate the first generating set.

8. The changeable damping wave power capturing device driven by a bidirectional screw rod according to claim 1, further comprises a control device, wherein said control device comprises:
   a second gear assembly, engaged with the first ring-shaped active gear and the second ring-shaped active gear, and comprising a second idle gear, a third slave gear, and a fourth slave gear; and
   a second generating set, comprising a second generating set rotation shaft connected to the third slave gear and the fourth slave gear.

9. The changeable damping wave power capturing device driven by a bidirectional screw rod according to claim 8 wherein the first generating set and second generating set differ in torque required to turn the generator and also differ in power output.

10. The changeable damping wave power capturing device driven by a bidirectional screw rod according to claim 9, further comprises a control device, wherein said control device comprises:
- a detecting element, connected to the elevator floating body or the water-proofing outer barrel assembly;
- a control set, disposed in the accommodating region and is electrically connected to the detecting element and the first and second elevator control mechanisms;
- a first elevator control mechanism, connecting to a fifth slave gear and a sixth slave gear, wherein the fifth slave gear engages to and positions between the first ring-shaped active gear and first slave gear; the sixth slave gear engages to and positions between the first idle gear and second slave gear; and through elevation of the first elevator control mechanism, the fifth slave gear and the sixth slave gear are correspondingly elevated and decoupled from their respective adjacent gears, so as to deactivate the first generating set; and
- a second elevator control mechanism, connecting to a seventh slave gear and an eighth slave gear, wherein the seventh slave gear engages to and positions between the first ring-shaped active gear and third slave gear; the eighth slave gear engages to and positions between the second idle gear and fourth slave gear; and through elevation of the second elevator control mechanism, the seventh slave gear and the eighth slave gear are correspondingly elevated and decoupled from their respective adjacent gears, so as to deactivate the second generating set.

* * * * *